(12) United States Patent
Raghavan (10) Patent No.: US 8,862,533 B2
(45) Date of Patent: Oct. 14, 2014

(54) METHOD AND APPARATUS FOR PORTABLE ELECTRONIC DEVICE MEDIA DATA STORAGE

(75) Inventor: Krishnan Raghavan, Bangalore (IN)

(73) Assignee: Motorola Mobility LLC, Libertyville, IL (US)

( * ) Notice: Subject to any disclaimer, the term of this patent is extended or adjusted under 35 U.S.C. 154(b) by 499 days.

(21) Appl. No.: 13/300,713

(22) Filed: Nov. 21, 2011

(65) Prior Publication Data

US 2013/0132329 A1    May 23, 2013

(51) Int. Cl.
*G06F 3/06* (2006.01)
*G06F 12/02* (2006.01)
*G06F 11/00* (2006.01)

(52) U.S. Cl.
CPC .......... *G06F 12/0223* (2013.01); *G06F 3/0679* (2013.01); *G06F 3/06* (2013.01); *G06F 2212/7204* (2013.01); *G06F 2212/1032* (2013.01); *G06F 3/0653* (2013.01); *G06F 2212/171* (2013.01); *G06F 2212/1036* (2013.01); *G06F 3/0617* (2013.01); *G06F 11/00* (2013.01); *G06F 3/0644* (2013.01)
USPC ......................................................... 706/50

(58) Field of Classification Search
USPC ......................................................... 706/52
See application file for complete search history.

(56) References Cited

U.S. PATENT DOCUMENTS

| | | | |
|---|---|---|---|
| 6,970,637 | B1 | 11/2005 | Yoshida |
| 7,590,666 | B2 | 9/2009 | Korman et al. |
| 7,693,877 | B1 | 4/2010 | Zasman |
| 2003/0105924 | A1 | 6/2003 | Spencer et al. |
| 2007/0031126 | A1 | 2/2007 | Jung et al. |
| 2007/0058052 | A1 | 3/2007 | Makela et al. |
| 2007/0294206 | A1 | 12/2007 | Korman et al. |
| 2008/0301504 | A1 | 12/2008 | Chen et al. |
| 2010/0161720 | A1 | 6/2010 | Colligan et al. |

OTHER PUBLICATIONS

Patent Cooperation Treaty, "PCT Search Report and Written Opinion of the International Searching Authority" for International Application No. PCT/US2012/063170 (CS37925) dated Mar. 25, 2013, 7 pages.

*Primary Examiner* — Jeffrey A Gaffin
*Assistant Examiner* — Ola Olude Afolabi
(74) *Attorney, Agent, or Firm* — Leydig, Voit & Mayer, Ltd.

(57) ABSTRACT

A method and apparatus store media data on a portable electronic device. The method can include monitoring media data storage activity regarding user media data storage activity usage patterns that store media data in a memory in a portable electronic device. The method can include storing the media data storage activity data in the portable electronic device. The method can include triggering a full memory prediction algorithm based on a user action event that affects media data storage in the memory and can include running the full memory prediction algorithm in response to the trigger. The full memory prediction algorithm can predict when the memory will be substantially full based on past user media data storage behavior according to the media data storage activity data. The method can include outputting a potential upcoming full memory indication.

20 Claims, 4 Drawing Sheets

METHOD AND APPARATUS FOR PORTABLE ELECTRONIC DEVICE MEDIA DATA STORAGE

BACKGROUND

1. Field

The present disclosure is directed to a method and apparatus for portable electronic device media data storage. More particularly, the present disclosure is directed to predicting memory on a portable electronic device will become full of record and/or playback data and directed to helping to avoid or delay the future full memory condition.

2. Introduction

Portable electronic devices used in today's society include mobile phones, personal digital assistants, digital video recorders, digital audio recorders, digital cameras, media players, multimedia devices, and various other electronic communication devices. These portable electronic devices can store media data, such as audio, video, and/or image data, that a user records and/or plays back on the portable electronic device. Unfortunately, this media data can accumulate and take up a large amount of memory on a portable electronic device. Thus, a device may run out of memory when a user is recording media data when the user has no means for backing up data.

For example, a user, in the middle of taking some photographs in a park on a holiday, suddenly runs out of space in his removable memory card and cannot take any further photographs. The user is forced to spend the next few minutes going through the contents in the card to get some space. In this process, the user loses some good photo-ops.

As another example, a user is out on his usual monthly trekking, listening to music on a device. The user gets an alert from a friend that there is a fantastic new music that has just been released. The user starts downloading the new album, but runs out of space on his device halfway through downloading and is forced to take a break and spend the next half hour cleaning up some memory to continue downloading the album. In this process, the user loses time while on a trip.

As a further example, a user is on a weekend trip outside and is taking some videos when the user suddenly runs out of disk space. The contents stored in the device are so important that the user cannot delete any of them. The user must then upload some of his existing videos to an online video tube service using a cellular data connection and the delete the data locally so the user can continue taking videos. Thus, the user wastes valuable and costly cellular bandwidth as well as time uploading the videos.

As an additional example, a user is outside visiting with close friends. As the user starts taking videos and pictures, the device runs out of memory. If the user does not have access to cellular or wireless data coverage or external data storage, the user is forced to delete some of the existing content on the device to continue taking pictures and videos since the user does not want to miss out on the current opportunity. In this case, the user is forced to part with precious data.

Thus, there is a need for method and apparatus for portable electronic device media data storage that predicts memory on the portable electronic device will become full.

BRIEF DESCRIPTION OF THE DRAWINGS

In order to describe the manner in which advantages and features of the disclosure can be obtained, various embodiments will be illustrated in the appended drawings. Understanding that these drawings depict only typical embodiments of the disclosure and do not limit its scope, the disclosure will be described and explained with additional specificity and detail through the use of the drawings in which.

DETAILED DESCRIPTION

A method and apparatus for portable electronic device media data storage that predicts memory on the portable electronic device will become full is disclosed. The method can include monitoring media data storage activity regarding user media data storage activity usage patterns that store media data in a memory in the portable electronic device. The method can include storing the media data storage activity data in the portable electronic device, where the media data storage activity data corresponds to the monitored media data storage activity. The method can include triggering a full memory prediction algorithm based on a user action event that affects media data storage in the memory. The method can include running the full memory prediction algorithm in response to the trigger, where the full memory prediction algorithm predicts when the memory will be substantially full based on past user media data storage behavior according to the media data storage activity data. The method can include outputting a potential upcoming full memory indication in response to predicting the memory will be substantially full.

Figure 1:
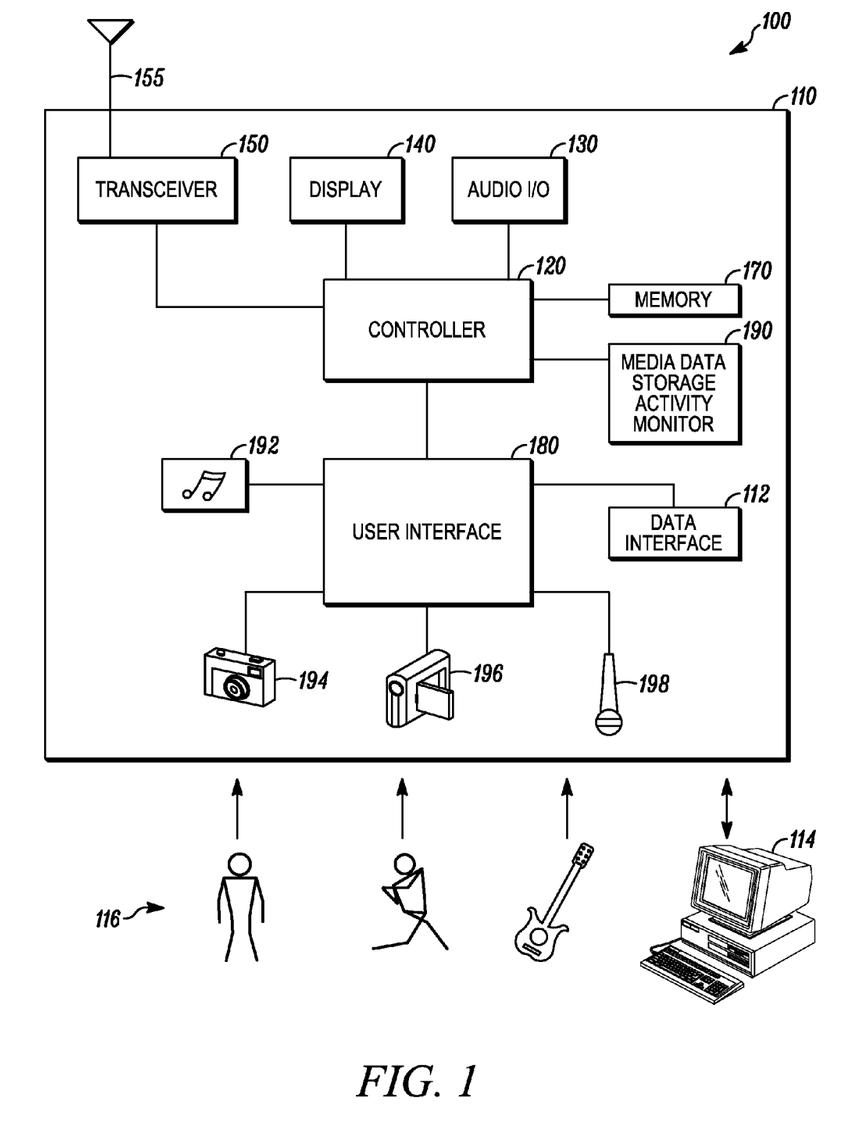
FIG. 1 is an example block diagram of a portable electronic device according to a possible embodiment.

FIG. 1 is an example block diagram of a portable electronic device 100 according to a possible embodiment. The portable electronic device 100 can be a cellular telephone, a wireless telephone, a digital camera, a digital video recorder, an audio recorder, a portable multimedia playback device, a personal digital assistant, a selective call receiver, or any other device that is capable of recording, storing, and/or playing back video, audio, images, and/or other multimedia.

The portable electronic device 100 can include a housing 110, a controller 120 located in the housing 110, audio input and output circuitry 130 coupled to the controller 120, a display 140 coupled to the controller 120, a transceiver 150 coupled to the controller 120, an antenna 155 coupled to the transceiver 150, a user interface 180 coupled to the controller 120, and a memory 170 coupled to the controller 120. The portable electronic device 100 can also include a media data storage activity monitor module 190. The media data storage activity monitor module 190 can be coupled to the controller 120, can reside within the controller 120, can reside within the memory 170, can be an autonomous module, can be software, can be hardware, or can be in any other format useful for a module for a portable electronic device 100.

The display 140 can be a liquid crystal display (LCD), a light emitting diode (LED) display, a plasma display, a touch screen display, a projector, or any other means for displaying information. Other methods can be used to present information to a user, such as aurally through a speaker or kinesthetically through a vibrator. The transceiver 150 may include a transmitter and/or a receiver. The audio input and output circuitry 130 can include a microphone, a speaker, a transducer, or any other audio input and output circuitry. The user interface 180 can include a keypad, buttons, a touch pad, a joystick, an additional display, a touch screen display, or any other device useful for providing an interface between a user and an electronic device. The memory 170 can include a removable memory card, a random access memory, a read only memory, an optical memory, a subscriber identity module memory, flash memory, hard drive memory, solid state memory, or any other memory that can be coupled to a portable electronic device.

The portable electronic device 100 can include a multimedia playback application 192, an image capture module 194, such as a camera, a video capture module 198, such as a video recorder, and a microphone 198. The multimedia playback application 192 can play audio and/or video data files on the portable electronic device 100. The image capture module 194 can take pictures in an environment 116 and store the corresponding image data on the portable electronic device 100. The video capture module 196 can capture video in the environment 116 and store the corresponding video data on the portable electronic device 100. The image capture module 194 and the video capture module 198 can use the same lens, can use independent lenses, and/or can use a plurality of lenses. The microphone 198 can capture audio in the environment 116 and store the corresponding audio data on the portable electronic device 100. The microphone 198 can be included in the audio input and output circuitry 130 or can be an independent microphone.

The portable electronic device 100 can include a data interface port 112. The data interface port 112 can transfer media data to and from an external storage device, such as the device 114. For example, the device 114 can include a personal computer, a laptop computer, an external hard drive, a server, remote storage, storage external to the portable communication device 110, or any other device that can store media data. The data interface port 112 can transfer data over a wired connection, such as a cable, or over a wireless connection, such as a wireless local area network connection, a wireless wide area network connection, such as a cellular data connection, an optical connection, or any other means for transferring media data from a portable electronic device to a storage device external to the portable electronic device 100. The data interface port 112 can be part of the transceiver 150 to wirelessly transfer media data to a storage device external to the portable electronic device 100.

In operation, the controller 120 can control operations of the portable electronic device. The memory 170 can store media data storage activity data in the portable electronic device 110. "Media data" as used herein is defined as data, such as audio, video, and/or image data, that a user records and/or plays back on a portable electronic device. The media data storage activity monitoring module 190 can monitor media data storage activity regarding user media data storage activity usage patterns that store media data in the memory 170 in the portable electronic device 100. The media data storage activity monitoring module 190 can store media data storage activity data corresponding to the media data storage activity in the memory 170. For example, the media data storage activity data can include a rate a user fills the memory 170 with media data, can include times when the user stores the media data, can include locations where the user stores the media data, can include the type of media data stored in the memory 170, and/or can include other media data storage activity data as described below. The media data storage activity monitoring module 190 can trigger a full memory prediction algorithm based on a user action event that affects media data storage in the memory. The media data storage activity monitoring module 190 can run the full memory prediction algorithm in response to the trigger. The full memory prediction algorithm can predict when the memory 170 will be substantially full based on past user media data storage behavior according to the media data storage activity data. The full memory prediction algorithm can be located in the media data storage activity monitoring module 190, in the memory 170, in the controller 120, or anywhere else useful for storing a full memory prediction algorithm. The user interface 180 can output a potential upcoming full memory indication in response to predicting the memory will be substantially full.

The full memory prediction algorithm can take into account a variety of factors. The factors can include a current or upcoming time, such as a day of the week, weekend/workday/holidays, vacations, or other upcoming times. The factors can include a current or upcoming location including specific places of interest, such as parks, beaches, zoos, ballparks, stadiums, and other upcoming locations. The factors can include a current or upcoming activity of a user, such as hiking, biking, train riding, bus riding, and other activities. The factors can include an identity of the user and the user's companions, such as factors related to when the user is in the company of a few specific friends. The factors can include current or upcoming surrounding conditions of the portable electronic device, such as the current weather, such as rainy, sunny, and other weather conditions. The factors can include current or upcoming events around the portable electronic device, such as trade fairs, exhibitions, sporting events, music events, and other events. The factors can also include other factors that can affect storage in the memory.

The user action event trigger can be based on the factors listed above. The user action event can also be based on a predetermined time, such as at the beginning of every day, the end of every day, a specified day of the week or month, or other recurring or non-recurring time periods. The user action event can also be based on a device condition, such as when device is being charged and/or when the phone is inactive. The user action event can also be based on a time period before an event, such as a week before a major vacation listed in the user's calendar. The user action event can also be based on other factors.

The potential upcoming full memory indication can alert the user and remind the user to cleanup media data. The indication can also ask the user if a rule needs to be set if the data can be backed up automatically under such conditions and can ask the user for a potential destination for media data backup. The indication or a menu item can give the user options for the potential media backup destination, such as a network, a home computer, cloud storage, or other storage destination. The indication or a menu item can also give the user options for a transfer method for the backup, such as over a wireless local area network connection, a cellular connection, a wired connection, or other transfer method for the backup.

The media data storage activity data can include a rate at which the memory gets filled with media data, can be the size of media data that gets added to the memory, or can include other media data storage activity data. For example, the media data can be video media data recorded with the portable electronic device, audio media data for playing music on the portable electronic device, image media data captured with a camera on the portable electronic device, compressed media data, uncompressed media data, or other media data. The media data storage activity data can include information about the type of media and the related rate at which the memory gets filled with media data for the type of media. The media data storage activity data can include other media data storage activity data.

According to one embodiment, the user action event can be an upcoming calendar event stored on the portable electronic device 100. The media data storage activity monitoring module 190 can trigger the full memory prediction algorithm at a predetermined time before the upcoming calendar event. The user action event can also include current environmental conditions of the portable electronic device 100. The current environmental conditions can be conditions proximal to the portable electronic device 100 where a user of the portable electronic device 100 typically records visual media on the portable electronic device 100. Such environmental conditions can be determined based on the media data storage activity data regarding user media data storage activity usage patterns. For example, visual media can include video recorded media, digital photographic recorded media, and other visual media that can be recorded from an environment surrounding the portable electronic device 100 onto the portable electronic device 100. As a further example, the current environmental conditions can be weather conditions proximal to the portable electronic device 100, other people proximal to the portable electronic device 100, a geographical location of the portable electronic device 100, public gatherings proximal to the portable electronic device 100, and other current environmental conditions. The public gatherings can include festivals, fairs, carnivals, amusement parks, sporting events, music performances, and other public gatherings where a user typically records media on the portable electronic device 100.

Embodiments can provide a method and device that can predict and know upfront, before its owner embarks on a trip or other destination, whether there is a good chance of a memory device in the device getting full. The device can alert the user so he/she should back up his data and free up space or take a backup card along with him/her, and/or perform any other related action. The device can automatically backup data, such as based on rules set by the user, and delete data to free up space. A method and device can predict if a memory device will get full and can help to avoid or delay filling the memory device. The projection can be based on past user behavior in filling the device and can take into account situations when the user has been forced into a memory full scenario or close to it. Embodiments can determine what factors a memory full condition prediction algorithm should take into account and what data is needed for the prediction. Embodiments can determine when to run the memory full condition prediction algorithm. Embodiments can determine what actions are taken if the algorithm predicts the memory will be full.

Embodiments can utilize a data gathering module, such as the media data storage activity monitor 190, that can continuously monitor and gather data. The data gathering module can at least log the rate at which a memory card or other memory device gets filled and/or the size of data that gets added/deleted and can maintain this against each combination of parameters that the algorithm takes into account for predicting the memory device getting full. The algorithm can range from a very simple implementation taking very few parameters to a very complex one involving a lot of combinations. The algorithm can predict if memory could get full and can proactively help to avoid the situation.

Figure 2:
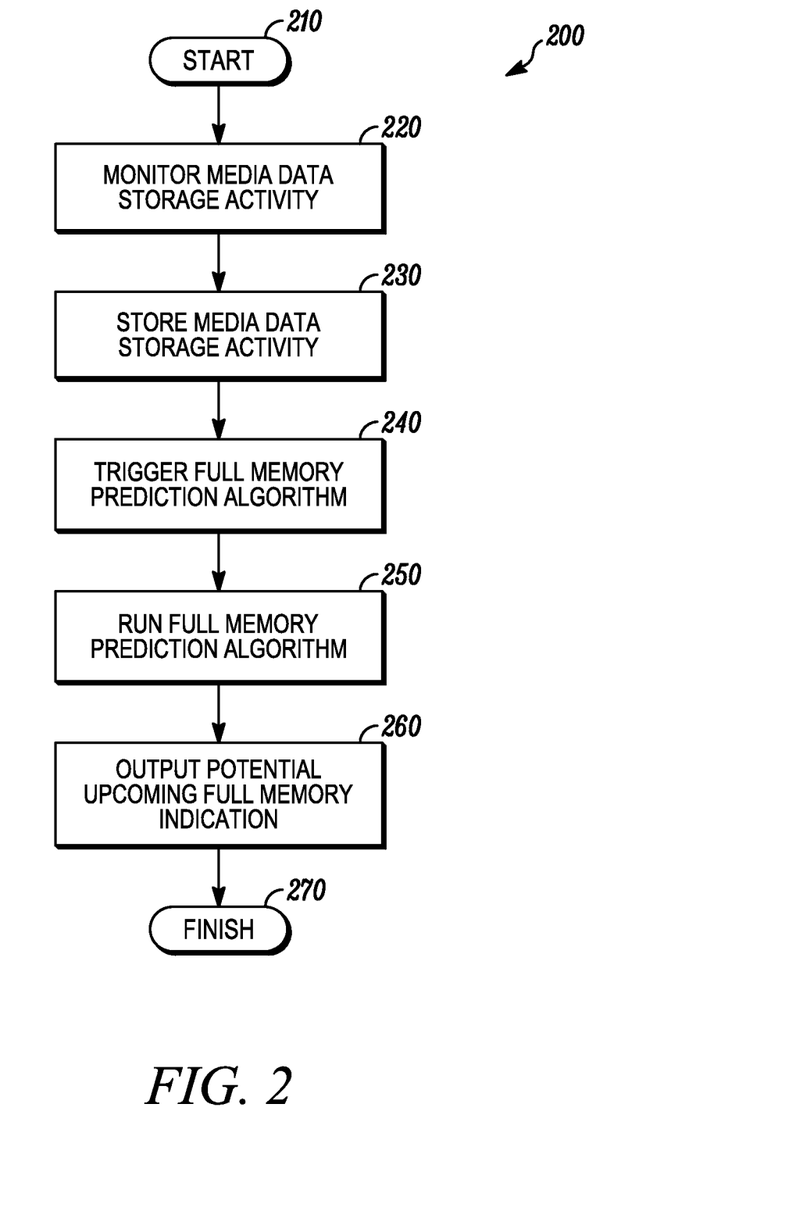
FIG. 2 illustrates an example flowchart illustrating the operation of the portable electronic device according to a possible embodiment.

FIG. 2 illustrates an example flowchart 200 illustrating the operation of the portable electronic device 100 according to a possible embodiment. At 210, the flowchart can begin. At 220, media data storage activity can be monitored. The media data storage activity can correspond to user media data storage activity usage patterns that store media data in a memory in the portable electronic device.

At 230, media data storage activity data can be stored in the portable electronic device. The media data storage activity data can correspond to the monitored media data storage activity. For example, the media data storage activity data can be a rate at which the memory gets filled with media data, the size of media data that gets added to the memory, or other media data storage activity data.

At 240, a full memory prediction algorithm can be triggered based on a user action event that affects media data storage in the memory. For example, the user action event can be an upcoming calendar event stored on the portable electronic device and the full memory prediction algorithm can be triggered a predetermined time before the upcoming calendar event. As another example, the user action event can be current environmental conditions of the portable electronic device. The current environmental conditions can include conditions proximal to the portable electronic device where a user of the electronic device typically records visual and/or audio media on the portable electronic device. The current environmental conditions can also include weather conditions proximal to the portable electronic device, other people proximal to the portable electronic device, a geographical location of the portable electronic device, public gatherings proximal to the portable electronic device, and other environmental conditions.

At 250, a full memory prediction algorithm can be run in response to the trigger. The full memory prediction algorithm can predict when the memory will be substantially full based on past user media data storage behavior according to the media data storage activity data. Running the full memory prediction algorithm can include running the full memory prediction algorithm in response to the trigger, where the full memory prediction algorithm can predict when the memory will be full based on past user media data storage behavior according to the media data storage activity data. The full memory prediction algorithm can predict when the memory will be full based on past user media data storage behavior according to the media data storage activity data by comparing potential upcoming media data storage activity corresponding to the user action event based on an amount of media data that the user stores in the memory for at least one past media data storage activity similar to an upcoming event corresponding to the user action event with an amount of available memory. The potential upcoming media data storage activity can be determined based on stored media data storage activity data.

For example, the potential upcoming media data storage activity can be determined based on media data storage activity data by determining the potential upcoming media storage activity to be the largest amount of media data stored at an event among a plurality of events similar to an upcoming event corresponding to the user action event. As another example, the potential upcoming media data storage activity can be determined based on media data storage activity data by determining the potential upcoming media storage activity to be an average amount of media data stored at an event among a plurality of events similar to an upcoming event corresponding to the user action event.

The user action event can be a calendar entry, a calendar reminder, user activity determined based on user movement determined using global positioning, a current device location, or any other user action event that can affect media data storage. The event corresponding to the user action event can be an event designated by a calendar entry, such as a vacation, a birthday, a holiday, a social gathering or any other event designated by a calendar entry. The event corresponding to the user action event can also be a destination input into a map function on the device, where the user typically stores media data at the destination and/or where the user does not have access to a network at the destination. The event corresponding to the user action event can also be a destination determined by movement of the device corresponding to a destination the user reaches when engaging in similar movement. The event corresponding to the user action event can also be any other event where the user typically stores media data at the destination and/or when the user does not have access to media data storage external from the device.

At 260, a potential upcoming full memory indication can be output in response to predicting the memory will be substantially full. At 270, the flowchart 200 can end.

According to some embodiments, all of the blocks of the flowchart 200 are not necessary. Additionally, the flowchart 200 or blocks of the flowchart 200 may be performed numerous times, such as iteratively. For example, the flowchart 200 may loop back from later blocks to earlier blocks. Furthermore, many of the blocks can be performed concurrently or in parallel processes.

Figure 3:
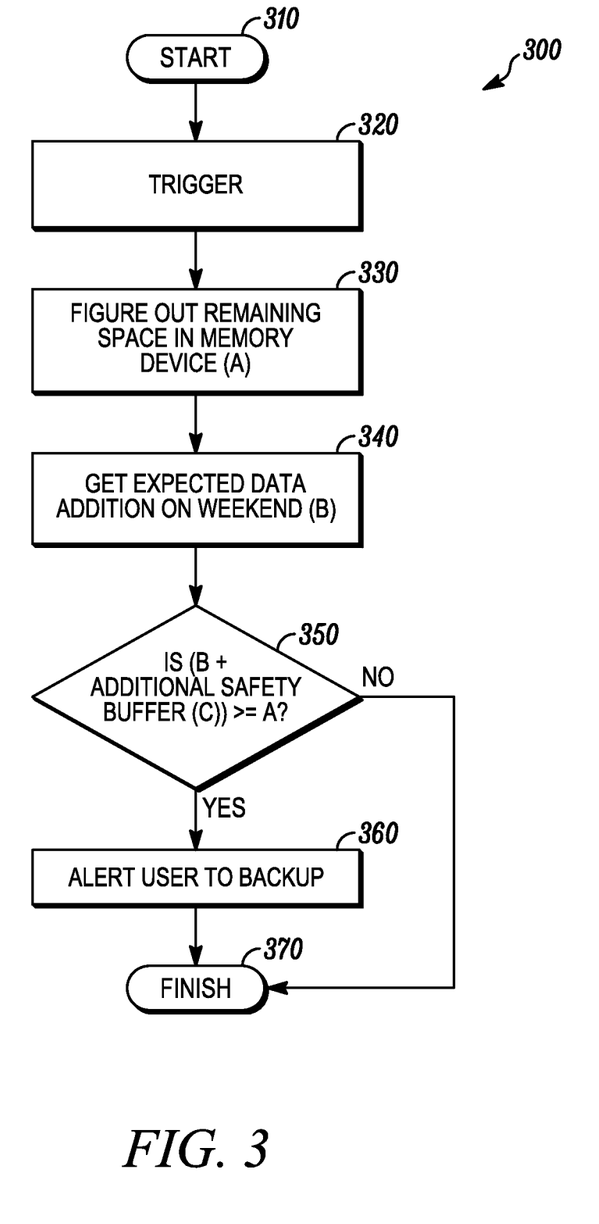
FIG. 3 illustrates an example flowchart illustrating the operation of the portable electronic device according to a possible embodiment.

FIG. 3 illustrates an example flowchart 300 illustrating the operation of the portable electronic device 100 according to one possible embodiment. At 310, the flowchart can begin. At 320, a trigger can start the algorithm. For example, a user can set the portable electronic device 100 to perform memory usage prediction every weekend, such as every Friday or every Sunday evening at 6:00 PM. At 330, the remaining space (A) in a memory device can be figured out. At 340, the expected data addition (B) to the memory device over the weekend can be obtained or determined. The expected data addition (B) can just be the weekend usages averaged over an available data set of data addition over past several weekends or can be otherwise determined as discussed above. At 350, a determination can be made as to whether (B plus an additional safety buffer (C)) is greater than or equal to A. The safety buffer (C) can already be stored or set by the user. If (B+C) is greater than or equal to A, then, at 360, an indicator, such as an alert, can be output to inform the user to backup and delete data from the memory device to create space on the memory device. At 370, the flowchart 300 can end. The flowchart 300 can illustrate an algorithm which performs prediction for when a user would run out of memory on a weekend based on past weekend usages.

According to some embodiments, all of the blocks of the flowchart 300 are not necessary. Additionally, the flowchart 300 or blocks of the flowchart 300 may be performed numerous times, such as iteratively. For example, the flowchart 300 may loop back from later blocks to earlier blocks. Furthermore, many of the blocks can be performed concurrently or in parallel processes. Additionally, blocks of the flowchart 300 can be combined with blocks of the flowcharts in other embodiments.

Figure 4:
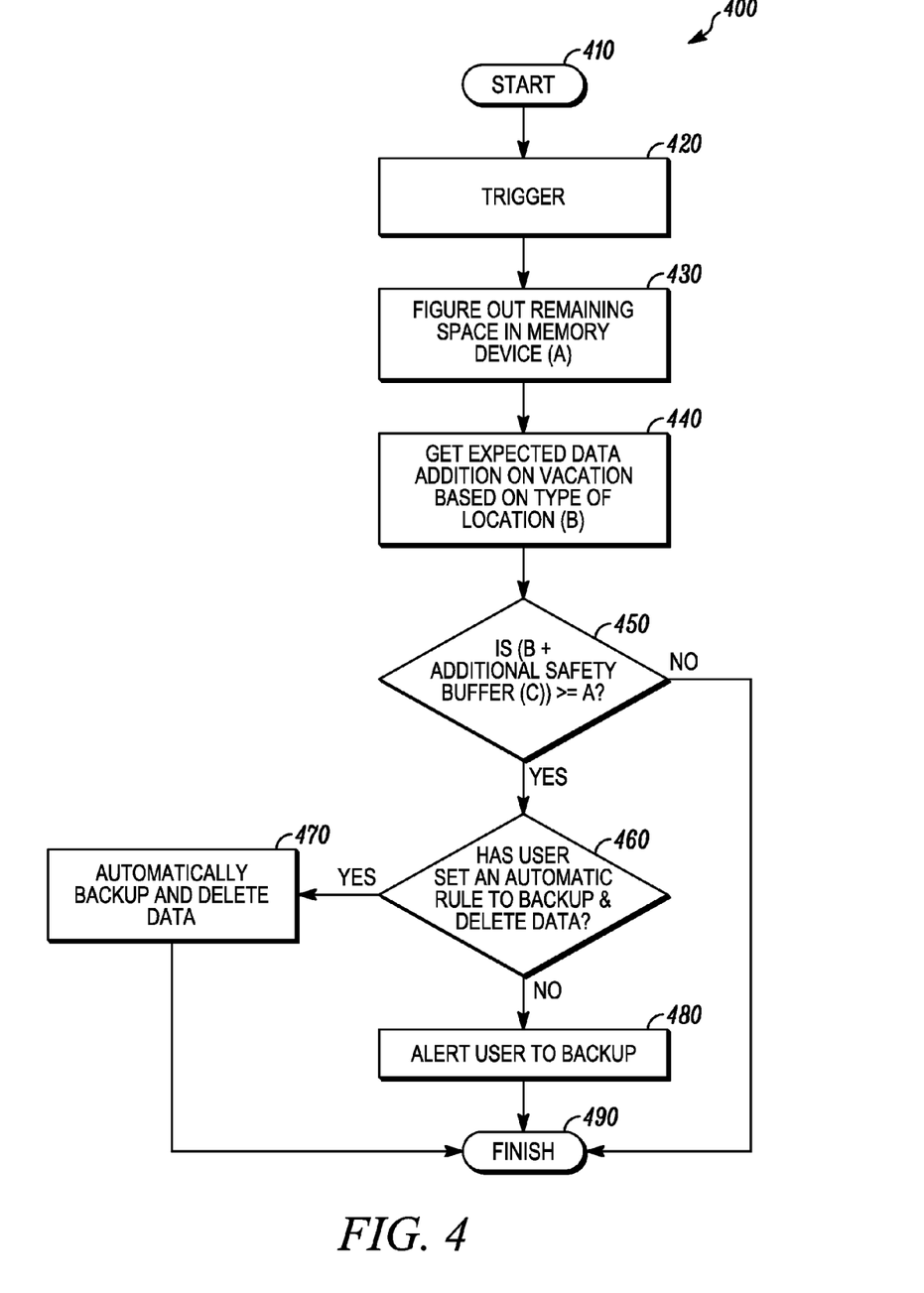
FIG. 4 illustrates an example flowchart illustrating the operation of the portable electronic device according to a possible embodiment.

FIG. 4 illustrates an example flowchart 400 illustrating the operation of the portable electronic device 100 according to one possible embodiment. At 410, the flowchart can begin. At 420, a trigger can start the algorithm. For example, as part of checking memory usage one week ahead of calendar dates, the algorithm can start running when it detects a vacation one week away. At 430, the remaining space (A) in a memory device can be figured out. At 440, the expected data addition (B) to the memory device over the vacation based on the type of vacation location can be obtained or determined. For example, a data gathering module can store data filling patterns of the user based on various destinations, such as beaches, parks, monuments, and other destinations while on vacation. The algorithm can figure out a matching scenario and project expected data addition (B) based on an average data usage, maximum data usage, a median of data usage, a mode of data usage, or other data usage for that type of scenario. At 450, a determination can be made as to whether (B plus an additional safety buffer (C)) is greater than or equal to A. The safety buffer (C) can already be stored or set by the user. If (B+C) is greater than or equal to A, then, at 460, a determination can be made as to whether an automatic backup and delete rule has been set. If an automatic backup and delete rule has not been set, at 480, an alert can be output to the use informing the user that the memory device may fill up and data should be backed up accordingly. If an automatic backup and delete rule has been set, then at 470 media data and/or other data in memory can be backed up. For example, data can be automatically transferred from memory to external storage when the device is docked with a computer, data can be automatically transferred from memory to external storage over a wireless local area network, data can be automatically transferred from memory to external storage over a cellular data network, and/or data can otherwise be automatically transferred from memory to external storage. When backing up the data, the device may or may not inform the user that the data was automatically backed up. According to this embodiment, a prediction can be made regarding a memory device will get full based on a vacation and type of destination location. At 490, the flowchart 400 can end.

According to some embodiments, all of the blocks of the flowchart 400 are not necessary. Additionally, the flowchart 400 or blocks of the flowchart 400 may be performed numerous times, such as iteratively. For example, the flowchart 400 may loop back from later blocks to earlier blocks. Furthermore, many of the blocks can be performed concurrently or in parallel processes. Additionally, blocks of the flowchart 400 can be combined with blocks of the flowcharts in other embodiments.

The methods of this disclosure may be implemented on a programmed processor. However, the operations of the embodiments may also be implemented on non-transitory machine readable storage having stored thereon a computer program having a plurality of code sections that include the blocks illustrated in the flowcharts, or a general purpose or special purpose computer, a programmed microprocessor or microcontroller and peripheral integrated circuit elements, an integrated circuit, a hardware electronic or logic circuit such as a discrete element circuit, a programmable logic device, or the like. In general, any device on which resides a finite state machine capable of implementing the operations of the embodiments may be used to implement the processor functions of this disclosure.

While this disclosure has been described with specific embodiments thereof, it is evident that many alternatives, modifications, and variations will be apparent to those skilled in the art. For example, various components of the embodiments may be interchanged, added, or substituted in the other embodiments. Also, all of the elements of each figure are not necessary for operation of the disclosed embodiments. For example, one of ordinary skill in the art of the disclosed embodiments would be enabled to make and use the teachings of the disclosure by simply employing the elements of the independent claims. Accordingly, the embodiments of the disclosure as set forth herein are intended to be illustrative, not limiting. Various changes may be made without departing from the spirit and scope of the disclosure.

In this document, relational terms such as "first," "second," and the like may be used solely to distinguish one entity or action from another entity or action without necessarily requiring or implying any actual such relationship or order between such entities or actions. The term "coupled," unless otherwise modified, implies that elements may be connected together, but does not require a direct connection. For example, elements may be connected through one or more intervening elements. Furthermore, two elements may be coupled by using physical connections between the elements, by using electrical signals between the elements, by using radio frequency signals between the elements, by using optical signals between the elements, by providing functional interaction between the elements, or by otherwise relating two elements together. Also, relational terms, such as "top," "bottom," "front," "back," "horizontal," "vertical," and the like may be used solely to distinguish a spatial orientation of elements relative to each other and without necessarily implying a spatial orientation relative to any other physical coordinate system. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a," "an," or the like does not, without more constraints, preclude the existence of additional identical elements in the process, method, article, or apparatus that comprises the element. Also, the term "another" is defined as at least a second or more. The terms "including," "having," and the like, as used herein, are defined as "comprising."

I claim:

1. A method comprising:
    monitoring media data storage activity regarding user media data storage activity usage patterns that store media data in a memory in a portable electronic device;
    storing media data storage activity data in the portable electronic device, where the media data storage activity data corresponds to the monitored media data storage activity;
    triggering a full memory prediction algorithm based on a user action event that affects media data storage in the memory;
    running the full memory prediction algorithm in response to the trigger, where the full memory prediction algorithm predicts when the memory will be substantially full based on past user media data storage behavior according to the media data storage activity data; and
    outputting a potential upcoming full memory indication in response to predicting the memory will be substantially full.

2. The method according to claim 1, wherein the media data storage activity data comprises one of a rate at which the memory gets filled with media data and the size of media data that gets added to the memory.

3. The method according to claim 1, wherein the memory comprises a removable memory card.

4. The method according to claim 1,
    wherein the user action event comprises an upcoming calendar event stored on the portable electronic device, and
    wherein triggering a full memory prediction algorithm comprises triggering the full memory prediction algorithm at a predetermined time before the upcoming calendar event.

5. The method according to claim 1, wherein the user action event comprises current environmental conditions of the portable electronic device.

6. The method according to claim 5, wherein the current environmental conditions comprise conditions proximal to the portable electronic device where a user of the electronic device typically records visual media on the portable electronic device, where the environmental conditions are determined based on the media data storage activity data regarding user media data storage activity usage patterns.

7. The method according to claim 5, wherein the current environmental conditions comprise one of weather conditions proximal to the portable electronic device, other people proximal to the portable electronic device, a geographical location of the portable electronic device, and public gatherings proximal to the portable electronic device.

8. A portable electronic device comprising:
    a portable electronic device housing;
    a controller contained within the portable electronic device housing the controller configured to control operations of the portable electronic device;
    a memory coupled to the controller, the memory configured to store media data storage activity data in the portable electronic device;
    a media data storage activity monitoring module coupled to the controller, the media data storage activity monitoring module configured to monitor media data storage activity regarding user media data storage activity usage patterns that store media data in the memory in the portable electronic device, where the media data storage activity monitoring module is configured to store media data storage activity data in the portable electronic device, where the media data storage activity data corresponds to the monitored media data storage activity, where the media data storage activity monitoring module is configured to trigger a full memory prediction algorithm based on a user action event that affects media data storage in the memory, where the media data storage activity monitoring module is configured to run the full memory prediction algorithm in response to the trigger, where the full memory prediction algorithm predicts when the memory will be substantially full based on past user media data storage behavior according to the media data storage activity data; and
    a user interface configured to output a potential upcoming full memory indication in response to predicting the memory will be substantially full.

9. The portable electronic device according to claim 8, wherein the media data storage activity data comprises one of a rate at which the memory gets filled with media data and the size of media data that gets added to the memory.

10. The portable electronic device according to claim 8, wherein the memory comprises a removable memory card.

11. The portable electronic device according to claim 8,
    wherein the user action event comprises an upcoming calendar event stored on the portable electronic device, and
    wherein the media data storage activity monitoring module is configured to trigger the full memory prediction algorithm by triggering the full memory prediction algorithm at a predetermined time before the upcoming calendar event.

12. The portable electronic device according to claim 8, wherein the user action event comprises current environmental conditions of the portable electronic device.

13. The portable electronic device according to claim 12, wherein the current environmental conditions comprise conditions proximal to the portable electronic device where a user of the electronic device typically records visual media on the portable electronic device where the environmental conditions are determined based on the media data storage activity data regarding user media data storage activity usage patterns.

14. The portable electronic device according to claim 12, wherein the current environmental conditions comprise one of weather conditions proximal to the portable electronic device, other people proximal to the portable electronic device, a geographical location of the portable electronic device, and public gatherings proximal to the portable electronic device.

15. A method comprising:
  monitoring media data storage activity regarding user media data storage activity usage patterns that store media data in a memory in a portable electronic device;
  storing media data storage activity data corresponding to the media data storage activity in the portable electronic device;
  triggering a full memory prediction algorithm based on a user action event that affects media data storage in the memory;
  running the full memory prediction algorithm in response to the trigger, where the full memory prediction algorithm predicts when the memory will be full based on past user media data storage behavior according to the media data storage activity data by comparing potential upcoming media data storage activity corresponding to the user action event based on an amount of media data that the user stores in the memory for at least one past media data storage activity similar to an upcoming event corresponding to the user action event with an amount of available memory, where the potential upcoming media data storage activity is determined based on stored media data storage activity data; and
  outputting a potential upcoming full memory indication in response to predicting the memory will be substantially full.

16. The method according to claim 15, wherein the media data storage activity data comprises one of a rate at which the memory gets filled with media data and the size of media data that gets added to the memory.

17. The method according to claim 15,
  wherein the user action event comprises an upcoming calendar event stored on the portable electronic device,
  wherein triggering a full memory prediction algorithm comprises triggering the full memory prediction algorithm at a predetermined time before the upcoming calendar event.

18. The method according to claim 15, wherein the user action event comprises current environmental conditions of the portable electronic device.

19. The method according to claim 18, wherein the current environmental conditions comprise conditions proximal to the portable electronic device where a user of the electronic device typically records visual media on the portable electronic device where the environmental conditions are determined based on the media data storage activity data regarding user media data storage activity usage patterns.

20. The method according to claim 18, wherein the current environmental conditions comprise one of weather conditions proximal to the portable electronic device, other people proximal to the portable electronic device, a geographical location of the portable electronic device, and public gatherings proximal to the portable electronic device.

* * * * *